Figure 1:
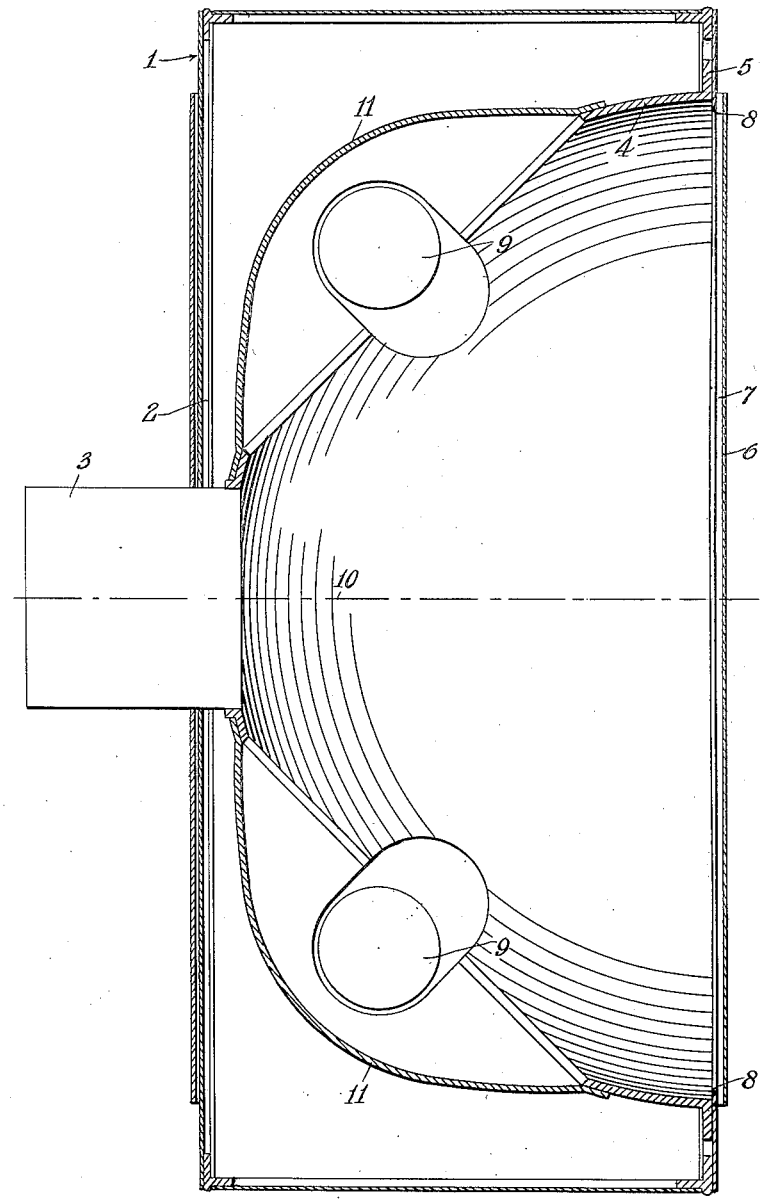

May 24, 1932.  A. H. BLOHM  1,859,761

OPAQUE PROJECTION SYSTEM

Filed April 2, 1927   2 Sheets-Sheet 1

August H. Blohm INVENTOR
BY Wm. S. Pritchard ATTORNEY

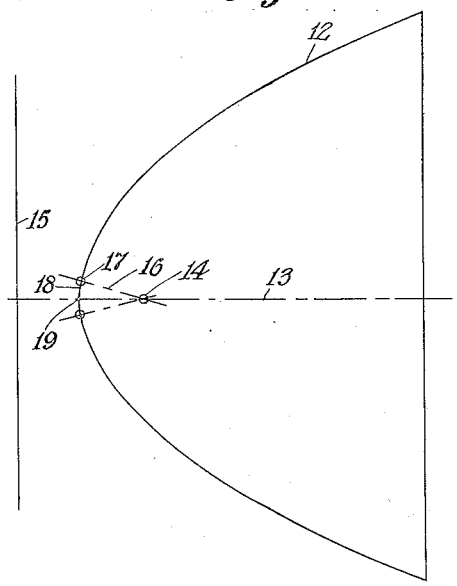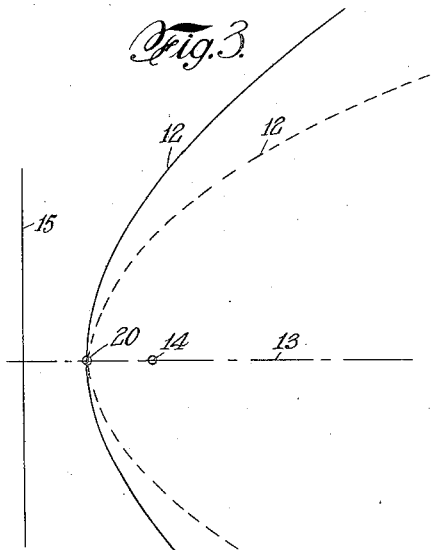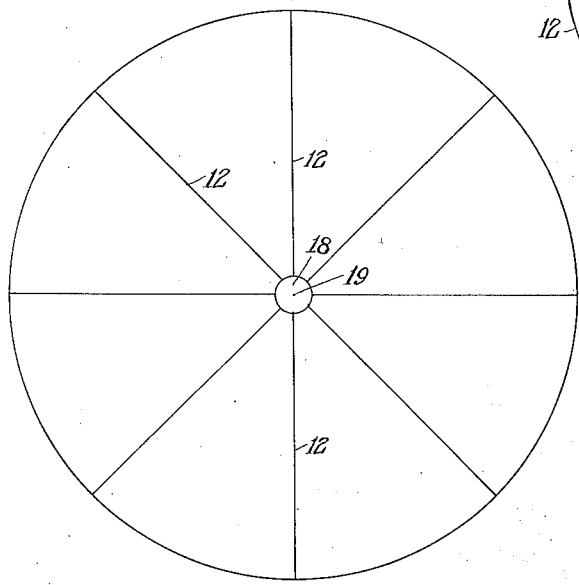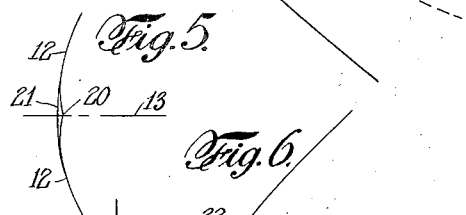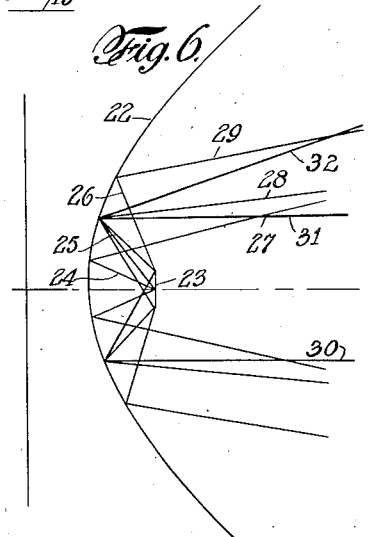

Patented May 24, 1932

1,859,761

UNITED STATES PATENT OFFICE

AUGUST H. BLOHM, OF ORANGE, NEW JERSEY, ASSIGNOR TO TRANS-LUX DAYLIGHT PICTURE SCREEN CORPORATION, OF NEW YORK, N. Y., A CORPORATION OF DELAWARE

OPAQUE PROJECTION SYSTEM

Application filed April 2, 1927. Serial No. 180,413.

This invention relates to a novel and improved projection system and more particularly to a novel type of reflector for use to direct the light from a lamp to a desired surface. The invention finds utility in various combinations but for the purposes of illustration I have shown and described it as used in a projection device, although it will be understood that the invention is not limited to that particular type of device.

It has been common to use parabolic reflectors with lamps, the principal advantage of this type of reflector being that it projects the rays of light from a lamp in a substantially cylindrical beam in which the rays are all substantially parallel to each other. This effect is theoretically achieved when a parabolic reflector is used with a point source of light located at the focus of the parabola. However, a point source of light is impossible to obtain and therefore the rays of light are not actually parallel to each other. Moreover, when a lamp is placed at the focus of a parabolic reflector, the image of the source of light is projected upon the screen, or other surface on to which the beam of light is thrown, and this result is extremely undesirable. In an effort to avoid forming the image of the source of light it has been customary to move the source away from the focus of the reflector. The image is still formed however, no matter how far the source may be moved from the focus or in what direction, the movement merely serving to spread or to concentrate the image, depending upon the direction of movement.

Therefore it is the primary object of my invention to provide a reflector which shall avoid the formation of an image of the source of light, thereby greatly increasing the efficiency of the illumination. By my invention the advantages of parabolic reflector are maintained and at the same time its disadvantages are avoided.

A further object of my invention is to provide a projection system particularly adapted for use with the so-called opaque type of projector and which will greatly improve the illumination of the opaque object which is to be projected upon the screen.

My invention is best understood from the following description when taken in connection with the accompanying drawings in which I have shown a selected embodiment of my invention as applied to a projector used for projecting opaque objects, although it is to be understood that the invention will find other uses.

Figure 1 is a horizontal sectional view through an opaque projector having my improved reflector mounted therein.

Figures 2, 3, 4, and 5 are diagrams illustrating the manner in which the reflector is designed.

Figure 6 is a diagram illustrating the paths taken by the various rays of light emanating from a source of light used with a reflector constructed according to my invention.

Referring now to the drawings in detail, the numeral 1 designates a suitable casing in the front wall 2 of which is mounted a suitable objective 3 which extends through the front wall, and the inner end of which is received within an opening in a reflector 4. This reflector is preferably spherical in shape and extends from the rear wall 5 of the casing to the objective as shown. Disposed in the rear wall 5 is a suitable support 6 for an opaque object 7 which is exposed to the interior of the reflector through a suitable opening 8 in the rear wall.

The object is illuminated by means of a plurality of lamps 9, here shown as two in number symmetrically disposed on opposite sides of the axis 10 of the objective, this axis coinciding with the center of the opening 8, and therefore with the approximate center of the object. Cooperating with each lamp is a reflector 11, preferably constructed in the novel manner more fully set forth hereinafter. Each of these reflectors directs the light from the lamp to the object, and each reflector is preferably parabolic in form.

The specific invention shown in Figure 1 therefore comprises the combination of a preferably spherical reflector, which will inclose the object, together with the sources of light which have individual reflectors adapted to concentrate the light from the lamps upon the object. By this arrangement the object receives the concentrated light from the reflectors 11, while any light which is deflected from the face of the object and does not pass directly through the objective 3 is caught by the reflectors 4 and 11 and, in very large measure, will be reflected back to the object. By this means the light is conserved and substantially all of it is used to illuminate the object, so that the image of the object is projected upon the usual screen with added clearness.

While I have referred to the reflector 11 as being parabolic in character, and while ordinary parabolic reflectors could be used in the combination illustrated in Figure 1, nevertheless I prefer to employ in that combination the improved type of reflector which I shall now describe.

In Figures 2, 3 and 4, I have illustrated the manner in which my novel reflector is designed. In Figure 2 is illustrated a section thorugh a true parabolic reflector, the inner surface of this reflector being shown in Figure 4. The surface is formed as a part of a paraboloid and generated by rotation of the parabolic element 12 about its axis 13. The focus of the parabola is indicated at 14, and its directrix at 15. If a point source of light were located at the focus, all rays of light emanating therefrom and striking the surface of the reflector would be deflected in a direction parallel to the axis 13, and numerous attempts have been made to take advantage of this theoretical property of a parabolic reflector to obtain a concentrated cylindrical beam of light. As pointed out above, however, the image of the source is formed upon the surface on to which the beam of light is projected, and my invention is designed to overcome this difficulty.

In designing my reflector I draw a line at an angle to the axis of the parabola and intersecting the parabola at a point. This line is preferably a radial line through the focus and is indicated at 16 in Figure 2, the line 16 passing through the focus 14 and intersecting the element 12 at 17. This line may be considered as being revolved about the axis 13 to form the surface 18 surrounding the vertex 19 of the paraboloid as best shown in Figure 4. This surface is theoretically removed from the paraboloid and then the elements 12, which of course are infinite in number, are each rotated about the focus 14 as a center until the point 17 on each element rests upon the axis 13 or until the line 16 coincides with the axis. The surface of the reflector may then be considered as being generated either by moving in each of the elements as described above or by revolving one of said elements about the axis 13 after the element has been displaced as described above.

The result is that the theoretical surface which will be formed by the displaced parabolic elements or by the revolution of one of these elements is symmetrically disposed in respect to the axis and would come to a point 20 on the axis 13 as shown in Figure 5 on a greatly exaggerated scale. The cusp thus formed is, of course, not incorporated in the finished reflector but is replaced by a suitable surface 21 which may be either a plane or a suitable curve, preferably substantially normal to the axis 13 and tangent to the generated surface of the reflector. The extent of the surface 21 is extremely small, in actual practice.

Figure 3 illustrates a section through a reflector constructed according to the above method and it will be seen that where this section cuts the surface of the reflector it defines two curves on opposite sides of the axis, and symmetrically disposed in respect thereto, these curves being formed by the displaced portions of the true parabola of Figure 2. These curves if continued would intersect the axis at the common point 20, and it will be noted that, as best shown in Figure 5, the axis is not normal to either curve at that point. The axis is, however, preferably substantially normal to the arbitrary surface 21.

Referring now to Figure 6 I have shown therein a reflector 22 constructed according to my invention and having a source of light exemplified by a vertical filament 23. It will be seen that the rays of light emanating from this filament and deflected by the reflector 22 are not parallel. The lack of parallelism is sufficient to avoid the formation of an image of the filament on the surface to which the light is being projected. This surface may be either an opaque object or a transparent object which is to be projected upon a screen and of course the filament image on the object would be greatly magnified upon the screen if the usual parabolic reflector were used. With this invention however the formation of the image is avoided and the filament may be placed at a point corresponding to the focus of the true parabola from which the reflector is evolved. By this means substantially all the advantages of a theoretically perfect parabola are obtained without any of the disadvantages resulting from the use of a source of light larger than a point.

For example, there are shown several rays 24, 25 and 26, emanating from the filament 23 and it will be seen that these rays when reflected along the lines 27, 28 and 29 respectively are not parallel, so that they will not form an image of the filament. At the same time, however, the rays are near enough to being parallel to form a substantially cylindrical beam of light.

The non-parallel rays will cross each other and thus break up the image of the filament. This action is exemplified by the rays 30, 31 and 32, which cross other rays emanating from the filament in some such manner as that indicated in exaggerated form in Figure 6.

My reflector may be used with an opaque projector, as illustrated in Figure 1, or may be used with transparent projection devices such as stereopticans and moving picture machines. Many other uses will readily suggest themselves to those skilled in the art.

I claim:

1. An opaque projection system comprising an objective adapted to receive rays of light from the face of an opaque object and to project said rays upon a screen, a source of light disposed between said object and said objective, a reflector disposed behind said source to direct rays of light to said object, and a second reflector surrounding said first reflector and adapted to receive rays of light deflected from said object and to reflect them back to said object.

2. An opaque projection system comprising an objective adapted to receive rays of light from the face of an opaque object and to project said rays upon a screen, a source of light disposed between said object and said objective, a reflector having a paraboloidal surface disposed behind said source to direct rays of light to said object, and a second reflector surrounding said first reflector and adapted to receive rays of light reflected from said object and to reflect them back to said object.

3. An opaque projection system comprising a casing having front and rear walls, means to dispose an object in said rear wall, an objective in said front wall, a source of light disposed between said walls, a reflector disposed behind said source and adapted to direct the light therefrom to said object, and a second reflector surrounding the first reflector and extending from said objective to said rear wall to complete an inclosure for said object and for said source of light.

4. An opaque projection system comprising a casing having front and rear walls, means to dispose an object in said rear wall, an objective in said front wall, a source of light disposed between said walls, a reflector disposed behind said source and having a paraboloidal surface, and a second reflector surrounding the first reflector and extending from said objective to said rear wall to complete an inclosure for said object and for said source of light.

5. An opaque projection system comprising an objective having an object disposed in the axis thereof, sources of light disposed between said object and said objective on opposite sides of said axis, individual reflectors for said sources adapted to direct the light therefrom to said object, and another reflector having an opening to receive said objective and forming with said individual reflectors an inclosure for said sources and said object.

6. An opaque projection system comprising an objective having an object disposed in the axis thereof, sources of light disposed between said object and said objective on opposite sides of said axis, a reflector behind each of said sources and having a paraboloidal surface, and another reflector having an opening to receive said objective and forming with said other reflectors an inclosure for said sources and said object.

7. In an opaque projection system, an objective adapted to receive rays of light from the face of an opaque object and to project said rays upon a screen, a source of light for illuminating said object, a reflector disposed behind said source to direct rays of light to said object, said reflector having a surface symmetrically disposed in respect to an axis, said surface being such that a plane including the axis and cutting the surface will define two curves on opposite sides of the axis, said curves being portions of parabolas which if continued would intersect the axis at a common point and at an angle such that the axis would not be normal to the curves at that point.

8. In an opaque projection system, an objective adapted to receive rays of light from the face of an opaque object and to project said rays upon a screen, a source of light for illuminating said object, a reflector disposed behind said source to direct rays of light to said object, said reflector having a surface symmetrically disposed in respect to an axis, said surface being such that a plane including the axis and cutting the surface will define two curves on opposite sides of the axis, said curves being portions of parabolas which if continued would intersect the axis at a common point and at an angle such that the axis would not be normal to the curves at that point, said reflector comprising a surface substantially normal to the axis at its intersection with the reflector and substantially tangent to said first named surface.

9. In an opaque projection system, an objective adapted to receive rays of light from the face of an opaque object and to project said rays upon a screen, a source of light for illuminating said object, a reflector disposed behind said source to direct rays of light to said object, said reflector having a surface symmetrical in respect to the longitudinal axis thereof and formed of elements each of which is a portion of a parabola to which the axis is not normal.

10. In an opaque projection system, an objective adapted to receive rays of light from the face of an opaque object and to project said rays upon a screen, a source of light for illuminating said object, a reflector disposed behind said source to direct rays of light to said object, said reflector having a surface symmetrical in respect to the longitudinal axis thereof and formed of elements each of which is a portion of a parabola to which the axis is not normal, said reflector comprising a surface substantially normal to the axis at its intersection with the reflector and substantially tangent to said first named surface.

In testimony whereof, I have affixed my signature to this specification.

AUGUST H. BLOHM.